United States Patent
DiRenzo et al.

(10) Patent No.: US 7,492,843 B2
(45) Date of Patent: Feb. 17, 2009

(54) METHOD OF SYNCHRONIZATION FOR PACKET BASED, OFDM WIRELESS SYSTEMS WITH MULTIPLE RECEIVE CHAINS

(75) Inventors: Michael T. DiRenzo, Coppell, TX (US); David P. Magee, Plano, TX (US); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 765 days.

(21) Appl. No.: 10/974,578

(22) Filed: Oct. 27, 2004

(65) Prior Publication Data

US 2005/0271174 A1   Dec. 8, 2005

Related U.S. Application Data

(60) Provisional application No. 60/576,322, filed on Jun. 2, 2004.

(51) Int. Cl.
*H04L 1/02* (2006.01)
*H04L 7/00* (2006.01)
*H04L 27/28* (2006.01)

(52) U.S. Cl. ............... 375/347; 375/260; 375/343; 375/365

(58) Field of Classification Search ............... 375/267, 375/347, 260, 340, 342, 343, 354, 365, 366, 375/368; 370/503, 509, 514
See application file for complete search history.

(56) References Cited

U.S. PATENT DOCUMENTS

| 5,488,638 | A * | 1/1996 | Kazecki et al. | 375/347 |
|---|---|---|---|---|
| 7,239,675 | B2 * | 7/2007 | Zehavi et al. | 375/334 |
| 2002/0041635 | A1 * | 4/2002 | Ma et al. | 375/267 |
| 2006/0176970 | A1 * | 8/2006 | Dai et al. | 375/267 |

* cited by examiner

*Primary Examiner*—Betsy L Deppe
(74) *Attorney, Agent, or Firm*—Steven A. Shaw; W. James Brady; Frederick J. Telecky, Jr.

(57) ABSTRACT

A system for synchronizing a wireless receiver is provided. The system includes a first antenna (101a) and a second antenna (101b) to receive wireless signals containing data packets. The system includes one or more analyzer components (156) operable to determine correlation metrics based on at least a portion of the first received signal and a portion of the second received signal. The system further includes a synchronization component (158) operable to use the correlation metrics to determine a preferred correlation metric for synchronization by the wireless receiver of the first and second received signals to decode the data packet. A method for synchronizing a receiver of two wireless signals is also provided.

6 Claims, 2 Drawing Sheets

METHOD OF SYNCHRONIZATION FOR PACKET BASED, OFDM WIRELESS SYSTEMS WITH MULTIPLE RECEIVE CHAINS

CROSS-REFERENCE TO RELATED APPLICATIONS

This application claims priority to U.S. Provisional Application No. 60/576,322 filed Jun. 2, 2004, and entitled "Method of Synchronization for Packet Based, OFDM Wireless Systems with Multiple Receive Chains," by Michael T. DiRenzo et al, incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to wireless communications, and more particularly, but not by way of limitation, to a method for synchronizing reception of orthogonal frequency division multiplexing packets in a device having multiple receive chains.

BACKGROUND OF THE INVENTION

In general, communication systems permit data or other signals to be transmitted from a first device to a second device via a communication channel which may be established wirelessly or over electrical or fiber optic cable. When transmitting information, the signal may be referred to as data. Thus, a voice or video signal that is transmitted may nevertheless be referred to as data. Data may be bundled into pieces called packets, frames, blocks, or cells, all of which may have similar meaning, but the term packet will be used hereinafter to refer to any bundle of data. A packet may be organized in a specific form to aid transmission, for example having specific fields and/or specific fixed length fields. Each field is separated into symbols, such as orthogonal frequency division multiplexing (OFDM) symbols. Demodulation of OFDM signals is promoted by precise time synchronization at the receiver to determine the starting position of each OFDM symbol.

SUMMARY OF THE INVENTION

One embodiment of the present disclosure provides a system for synchronizing a wireless receiver. The system includes a first antenna and a second antenna to receive wireless signals containing data packets. The system includes one or more analyzer components operable to determine correlation metrics based on at least a portion of the signal received by the first antenna and a portion of the signal received by the second antenna. The system further includes a synchronization component operable to use the correlation metrics to determine a preferred correlation metric for synchronization by the wireless receiver of the first and second received signals to decode the data packets.

In another embodiment, a device for synchronizing a wireless receiver is provided. The device includes at least two antennas operable to receive wireless signals. A first antenna receives a first wireless signal and a second antenna receives a second wireless signal. The device includes at least two correlation components including a first and second correlation components. The first correlation component calculates a first metric representing the correlation between a first training field of the first wireless signal and a first known content of the first training field. The first metric has a first maximum. The second correlation component calculates a second metric representing the correlation between a second training field of the second wireless signal and a second known content of the second training field. The second metric has a second maximum. The device includes a synchronization component that selects one of the first and second metrics as a preferred metric based on the greater of the first and the second maximums. The device further includes at least two synchronization state machines each operable to generate a synchronization signal related to the preferred metric. The synchronization state machines are coupled to the synchronization component. The first synchronization state machine generates a first synchronization signal and the second synchronization state machine generates a second synchronization signal.

In other embodiments, a method of synchronizing a receiver of two wireless signals is provided. The method includes transforming a first wireless signal to a first sequence of digital values and comparing the first sequence of digital values to a known sequence of digital values. The method includes transforming a second wireless signal to a second sequence of digital values and comparing the second sequence of digital values to the known sequence of digital values. The method also includes aligning a start of a first portion of the first and second sequences of digital values based on the comparison of the first and second sequences of digital values to the known sequence of digital values.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

To correctly decode a wireless data packet, a receiver estimates the location of a known field within the wireless data packet. The location of the known field may then be used to establish the orientation of the remainder of the wireless data packet relative to the known field. In an embodiment, a field within a wireless data packet comprises a known sequence of values. The receiver repeatedly shifts the orientation of a subsequence of the received data of the wireless data packet to create a trial orientation and then calculates a mathematical correlation between the subsequence of the received data of the trial orientation and the known sequence of values. The maximum calculated mathematical correlation is deemed the preferred estimate for the orientation of the subsequent received data and hence of the entire wireless data packet.

Figure 1:
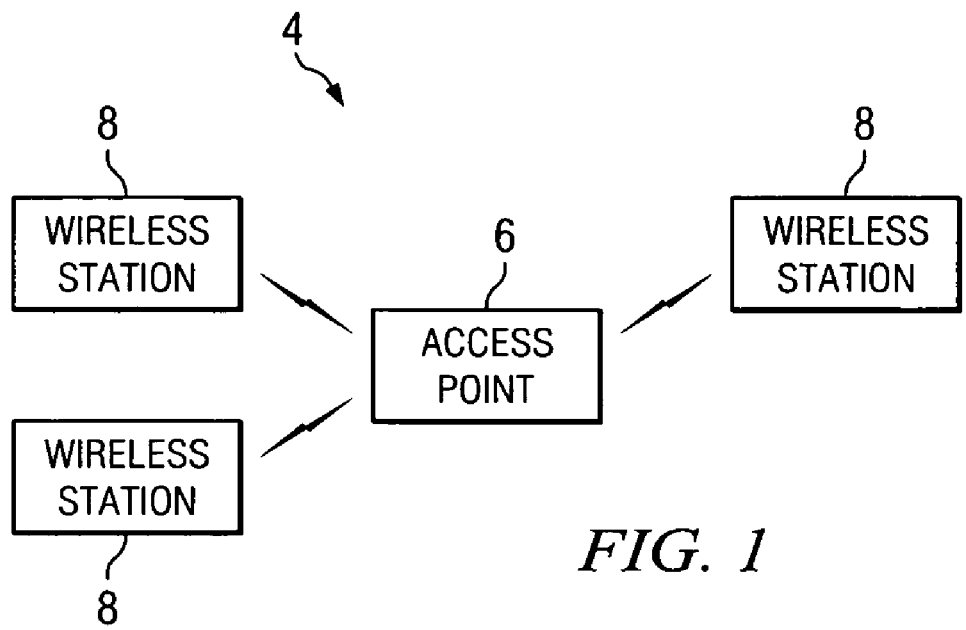
FIG. 1 is a block diagram of an exemplary wireless local area network suitable for deploying embodiments of the present disclosure.

Turning now to FIG. 1, a communication network 4 is illustrated that is implemented in accordance with one embodiment. As shown, the network 4 comprises at least one access point 6 configured to wirelessly communicate with at least one wireless station 8. Three wireless stations 8 are depicted in the exemplary network 4, but in other embodiments either more or fewer wireless stations 8 may communicate with the access point 6. The access point 6 may include a wired connection (not shown) to a server or other suitable network device (also not shown) whereby the wireless network 4 is connected to a wired network such as the public data network, for example the Internet (not shown). Additional access points 6 may be included as desired thereby permitting the wireless stations 8 to wirelessly access the wired network via any of a plurality of access points 6.

In addition to communicating with the access point 6, which may be termed infrastructure mode, the wireless stations 8 also may be configured to communicate directly with each other, without the intervention of the access point 6, which may be termed ad-hoc mode or peer-to-peer mode. The wireless stations 8 may comprise desktop computers, notebook computers, computer-related equipment in general, or any other type of device or equipment to be used in a communication network.

Figure 2:
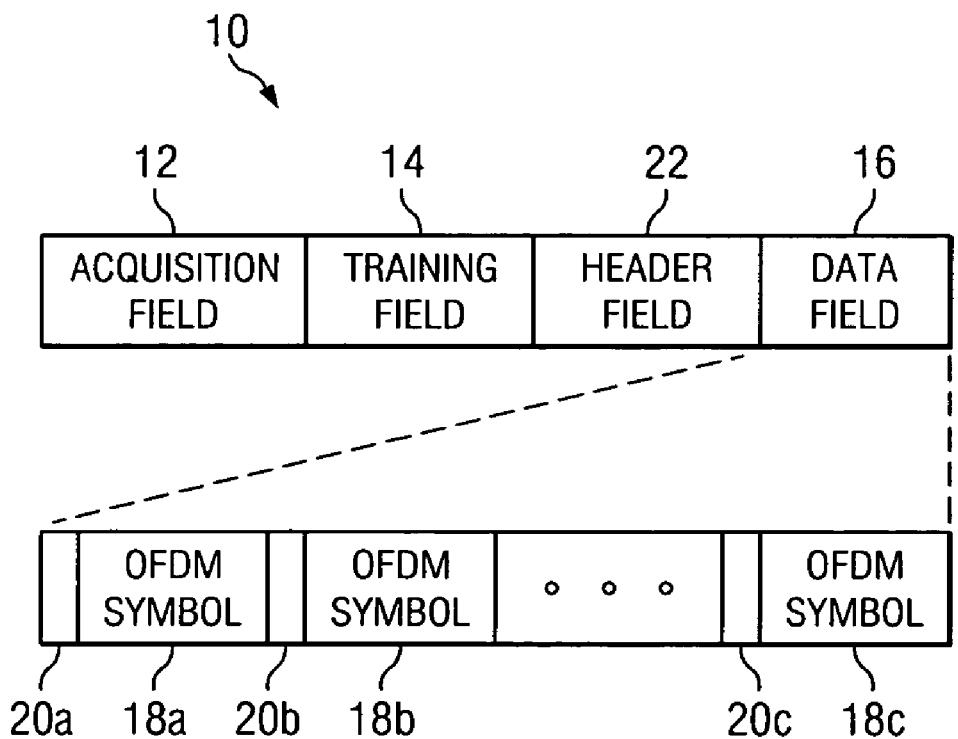
FIG. 2 depicts a data packet in accordance with one or more embodiments of the present disclosure.

Turning now to FIG. 2, a diagram illustrates an exemplary OFDM packet 10. The exemplary OFDM packet 10 comprises an acquisition field 12, a training field 14, a header field 22, and a data field 16. The acquisition field 12 is used for detection of a valid packet and for automatic gain control (AGC) settling. The training field 14 is used for estimation and/or equalization of the wireless channel characteristics to decode the data field 16. The content of the acquisition field 12 and the training field 14 are predefined and known to the receiver. The header field 22 denotes the number of OFDM symbols in the data field 16. The data field 16 comprises a plurality of OFDM symbols 18 each prepended with a cyclic prefix 20. The cyclic prefix 20 mitigates intersymbol interference due to characteristics of the wireless propagation channel. Additionally, the cyclic prefix 20 provides some margin in the estimation of the time instant for synchronizing the decoder algorithms of the receiver with the reception of the individual OFDM symbols 18.

To receive the OFDM packet 10 it is desirable to estimate where the training field 14 is in the signal received. This is done to determine where the data field 16 begins. This may be termed time synchronization of the receiver or simply synchronization of the receiver. The knowledge that the receiver has of the training field 14 in the OFDM packet 10 may be used with a matched filter correlator circuit to estimate synchronization timing. The function g(t) represents the predetermined and known complex baseband signal transmitted as the training field, where $0 \leq \tau \leq \tau$ and $\tau$ is the length of the training field 14. For a sampling rate $F_s$, the function g(k) is the sampled-data representation of the complex baseband signal g(t) transmitted during the training field where k is the sample number, $1 \leq k \leq L$ and $L = F_s \times \tau$ is the number of samples contained in g(k). The function x(k) represents the complex analog-to-digital samples of the received baseband signal. Then the time synchronization can be estimated by detecting the time instant when the maximum value of the metric m(k) occurs, where:

$$m(k) = |\text{Re}[c(k)]| + |\text{Im}[c(k)]| \text{ and } c(k) = \sum_{n=0}^{N-1} x(k-n)g*(N-k)$$

where $N \leq L$ is the length of the matched filter correlator. Note that the matched filter correlator output is c(k). Also, note that g*( ) is the complex conjugate of g( ). The metric m(k) may be referred to as the correlation metric. Theoretically, the maximum value occurs for the value of k at which the predefined training field and the received signal best match, as determined by the correlation operation. Knowing how to match the received signal to the predefined training field permits the synchronization of the receiver to receive the data field 16. The metric m(k) is robust but may be subject to degradation in the presence of lower receiver signal-to-noise-ratio (SNR) or of wireless channels with significant multipath.

Figure 3:
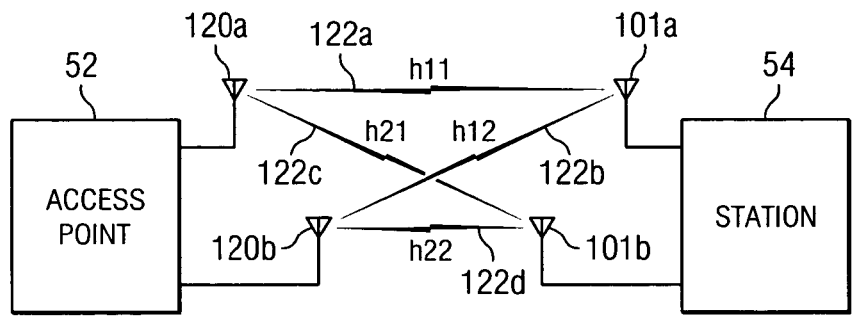
FIG. 3 depicts a wireless access point in communication with a wireless station employing four communication channels according to another embodiment of the present disclosure.

Turning now to FIG. 3, a block diagram shows an access point 52 in wireless communication with a wireless station 54. The wireless station 54 includes two antennas 101—a first antenna 101a and a second antenna 101b. The access point 52 includes two antennas 120—a third antenna 120a and a fourth antenna 120b. Four wireless communication channels 122—a first h11 wireless channel 122a from the first transmit antenna 120a to the first receive antenna 101a, a second h12 wireless channel 122b from the second transmit antenna 120b to the first receive antenna 101a, a third h21 wireless channel 122c from the first transmit antenna 120a to the second receive antenna 101b, and a fourth h22 wireless channel 122d from the second transmit antenna 120b to the second receive antenna 101b—are established between the wireless station 54 and the access point 52. The baseband received signals at the wireless station 54 can be expressed in the time domain as $$x_1(k) = h_{11}(k) \otimes z_1(k) + h_{12}(k) \otimes z_2(k) + n_1(k)$$

$$x_2(k) = h_{21}(k) \otimes z_1(k) + h_{22}(k) \otimes z_2(k) + n_2(k)$$

where $x_1(k)$ is the received signal at antenna 101a, $x_2(k)$ is the received signal at antenna 101b, $z_1(k)$ is the transmitted signal at antenna 120a, $z_2(k)$ is the transmitted signal at antenna 120b, $n_1(k)$ is the noise in the received signal at antenna 101a, $n_2(k)$ is the noise in the received signal at antenna 101b and the symbol $\otimes$ denotes convolution.

The four wireless channels 122 are bi-directional when considered in the context of a time-division duplex (TDD) communication system. Two independent streams of information may be transmitted over the four wireless channels—a first wireless information stream and a second wireless information stream. The two antennas 120 associated with the access point 52 are located relatively close together, about ½ wavelength apart. Similarly, the two antennas 101 associated with the wireless station 54 are located relatively close together, about ½ wavelength apart. For example, if the wireless frequency is about 2.5 GHz, ½ wavelength would equate to about or less than 2.36 inches (6 cm) (the exemplary calculation of 2.36 inches is based on the speed of propagation in free space, whereas the communication network 4 may operate in an environment with a reduced speed of propagation and hence exhibit a shorter wavelength).

Figure 4:
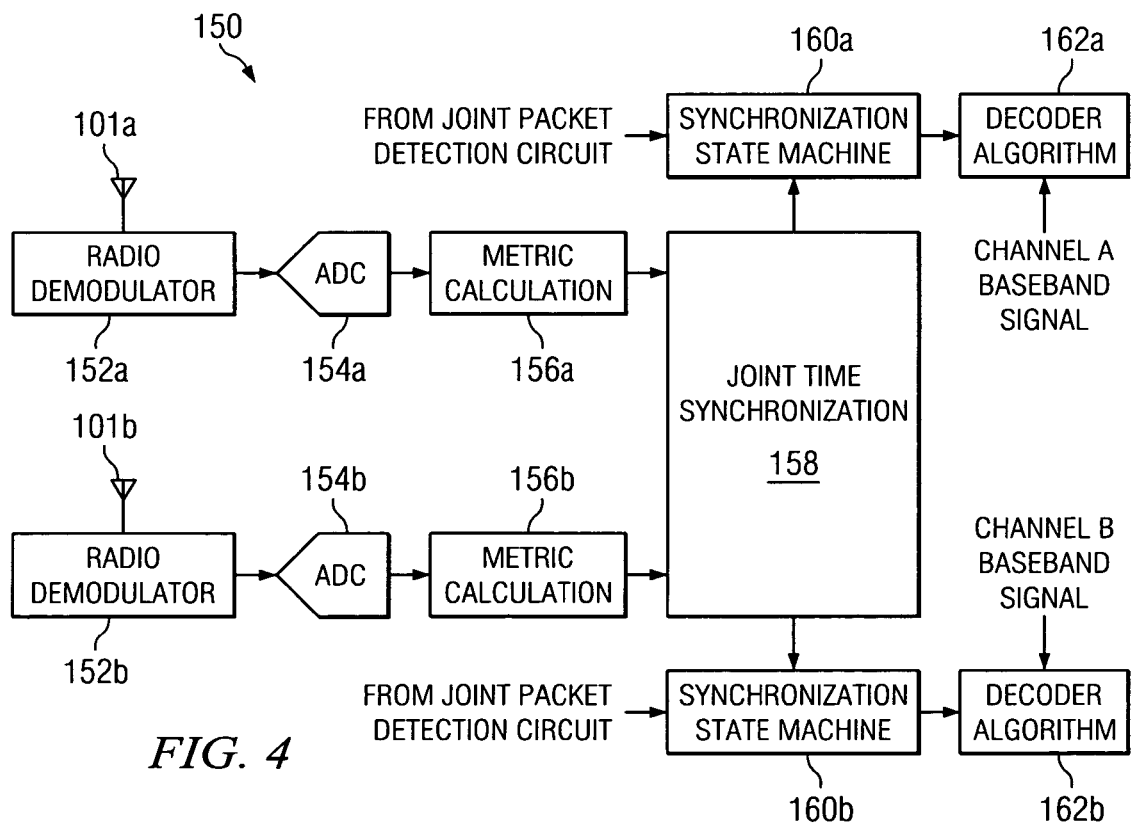
FIG. 4 is a block diagram of a system for synchronizing packet based OFDM wireless systems having multiple receive chains according to an embodiment of the present disclosure.

Turning to FIG. 4, an exemplary circuit 150 according to one embodiment is illustrated. The circuit 150 uses the metric m(k) described above to synchronize the reception of two streams of OFDM symbols. The first antenna 101*a* receives a radio frequency signal that is the combination of an OFDM signal from the first channel 122*a* and an OFDM signal from the second channel 122*b*. The radio frequency signal is processed by a first radio demodulator 152*a*. The first radio demodulator 152*a* extracts a first baseband signal from the radio frequency signal received by the first antenna 101*a*. The first radio demodulator 152*a* provides the first baseband signal to a first analog-to-digital converter 154*a* which converts the first baseband signal into a sequence of digitized samples of the first baseband signal. The first analog-to-digital converter 154*a* provides the sequence of digitized samples of the first baseband signal to a first metric calculator 156*a*. The first metric calculator 156*a* calculates and outputs the metric m1(k) of first information stream 122*a* on the sequence of digitized samples of the first baseband signal. The metric calculator 156*a* outputs the metric m1(k) of first information stream 122*a* to a joint time synchronization component 158. The second antenna 101*b*, a second radio demodulator 152*b*, a second analog-to-digital converter 154*b*, and a second metric calculator 156*b* provide similar processing to calculate and output a metric m2(k) for the second information stream 122*b*. Note that the predetermined and known complex baseband signal transmitted as the training field may be different for first information stream 122*a* versus second information stream 122*b*. Thus, in an embodiment it may be the case that g1(k)≠g2(k).

The joint time synchronization component 158 compares the two metrics m(k), for example the m1(k) calculated from the first received signal $x_1(k)$ by the first metric calculator 156*a* and the m2(k) calculated from the second received signal $x_2(k)$ the second metric calculator 156*b*, and selects the m(k) with the largest value, designated M(k). M(k) may be referred to as the preferred metric. The joint time synchronization component 152 outputs M(k) to a first synchronization state machine 160*a* associated with the first information stream 122*a* and to a second synchronization state machine 160*b* associated with the second information stream 122*b*.

The first synchronization state machine 160*a* generates a first synchronization signal for use by a first decoder algorithm 162*a* associated with the first received signal $x_1(k)$ to determine where the data field 16 of the OFDM packet 10 of the first information stream 122*a* begins. The second synchronization state machine 160*b* generates a second synchronization signal for use by a second decoder algorithm 162*b* associated with the second received signal $x_2(k)$ to determine where the data field 16 of the packet 10 of the second information stream 122*b* begins. The first decoder algorithm 162*a* receives a baseband signal $x_1(k)$ and the second decoder algorithm 162*b* receives a baseband signal $x_2(k)$. The first baseband signal and the second baseband signal may be transferred to the decoder algorithms 162*a*, 162*b* from the analog-to-digital converters 154*a*, 154*b* or they may be transferred to the decoder algorithms 162*a*, 162*b* from a different source.

While the description above is directed to the access point 6 and the wireless stations 8 each having two antennas and communicating over four communication channels, it will be readily appreciated by one skilled in the art that the disclosure can be extended to apply to systems utilizing any number of transmit antennas in combination with two or more receive antennas.

In an embodiment, a single transmit antenna may be employed to send a single stream of information to two receive antennas. In this case, the same synchronization processing described above may be employed to calculate the metric m(k) for the signal received on each of the two channels h11 and h21 and the preferred metric selected from the two received signals. Similarly, the processing described above may be employed for two transmit antennas and four wireless channels.

The metric calculator 156 and the joint time synchronization component 158 described above are functional blocks that may be implemented as software which is executed on a general purpose central processing unit. Alternatively, the metric calculator 156 and the joint time synchronization component 158 may be realized in integrated circuits, for example application specific integrated circuits (ASICs), field programmable gate arrays (FPGAs), complex programmable logic devices (CPLDs), portions of digital signal processors, portions of microprocessors, portions of microcontrollers, or other special purpose circuit realizations known to those skilled in the art. The metric calculator 156 and the joint time synchronization component 158 may be combined with one or more of the other components described above with reference to FIG. 4 as a "system on a chip" including the antennas 101, the radio demodulators 152, the analog-to-digital converters 154, the synchronization state machines 160, and other functional components of a communication receiver.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A device to synchronize a wireless receiver, comprising:
   at least two antennas operable to receive wireless signals including at least a first antenna operable to receive a first wireless signal and a second antenna operable to receive a second wireless signal;
   at least two correlation components including a first and second correlation components, the first correlation component operable to calculate a first metric representing the correlation between a first training field of the first wireless signal and a first known content of the first training field, the first metric having a first maximum, the second correlation component operable to calculate a second metric representing the correlation between a second training field of the second wireless signal and a second known content of the second training field, the second metric having a second maximum;

a synchronization component operable to select one of the first and second metrics as a preferred metric based on the greater of the first and the second maximums; and at least two synchronization state machines each operable to generate a synchronization signal related to the preferred metric, the synchronization state machines coupled to the synchronization component and operable such that the first synchronization state machine generates a first synchronization signal and the second synchronization state machine generates a second synchronization signal.

2. The device of claim 1, wherein each wireless signal is an orthogonal frequency division multiplexing signal.

3. A device to synchronize a wireless receiver, comprising:

at least two correlation components, a first correlation component operable to calculate a first metric representing a correlation between a training field of a first wireless signal and a first known content of the first training field, the second correlation component operable to calculate a second metric representing the correlation between a second training field of a second wireless signal and a second known content of the second training field;

a synchronization component operable to select one of the first and second metrics as a preferred metric; and at least one synchronization state machine operable to generate a synchronization signal related to the preferred metric.

4. The device of claim 3, wherein the synchronization signal is used to decode at least one packet.

5. The device of claim 3, wherein each wireless signal is an orthogonal frequency division multiplexing signal.

6. The device of claim 3, the first metric having a first maximum, the second metric having a second maximum, and a synchronization component operable to select one of the first and second metrics as a preferred metric based on the greater of the first and the second maximums.

* * * * *